(12) United States Patent
Carrein (10) Patent No.: US 6,262,744 B1
(45) Date of Patent: Jul. 17, 2001

(54) WIDE GAMUT DISPLAY DRIVER

(75) Inventor: Geert Carrein, Moorslede (BE)

(73) Assignee: Barco n.v., Poperinge (BE)

( * ) Notice: Subject to any disclaimer, the term of this patent is extended or adjusted under 35 U.S.C. 154(b) by 0 days.

(21) Appl. No.: 09/182,523

(22) Filed: Oct. 30, 1998

Related U.S. Application Data (63) Continuation of application No. PCT/BE97/00057, filed on May 7, 1997.

(30) Foreign Application Priority Data

May 7, 1996 (BE) .................................................. 09600405

(51) Int. Cl.$^7$ ................................. G09G 5/02; G03F 3/00
(52) U.S. Cl. ............................ 345/431; 345/22; 345/204; 358/515; 358/518; 358/519
(58) Field of Search ..................................... 345/431, 199, 345/153, 154, 150, 22, 156, 204, 205; 358/520, 518, 515, 519, 517; 382/167, 1.2; 349/57, 62, 95; G09G 5/02; G03F 3/00

(56) References Cited

U.S. PATENT DOCUMENTS

| | | | |
|---|---|---|---|
| 5,416,890 | * | 5/1995 | Beretta .................................. 345/431 |
| 5,650,942 | * | 7/1997 | Granger ................................. 364/526 |
| 5,781,257 | * | 7/1998 | Gal ........................................ 349/57 |
| 5,801,854 | * | 9/1998 | Naylor, Jr. ............................. 358/518 |
| 5,857,063 | * | 1/1999 | Poe ........................................ 395/109 |
| 5,896,122 | * | 4/1999 | MacDonald .......................... 345/153 |
| 6,072,902 | * | 6/2000 | Myers .................................. 345/154 |

\* cited by examiner

*Primary Examiner*—Matthew Luu
*Assistant Examiner*—Wesner Sajous
(74) *Attorney, Agent, or Firm*—Pillsbury Winthrop LLP (57) ABSTRACT

The present invention relates to a method for coding a signal which describes a picture as a function of three tristimulus values (X, Y, Z), to produce a signal which describes the picture as a function of n independent display primaries (R, G, B, D1, . . . , Dn−3), with n>3. In this method, for each color to be represented, drive signals for the display primaries (R, G, B, D1, . . . , Dn−3) are calculated via a comparison of the location of that color with respect to a straight line in the chromaticity diagram. A number of the drive signals are mutually exclusive.

The invention also relates to a display system comprising n display primaries, where n>3.

43 Claims, 5 Drawing Sheets

WIDE GAMUT DISPLAY DRIVER

This is a continuation of International Appln. No. PCT/BE97/00057 filed May 7, 1997 which designated the U.S.

The present invention is in the field of driving a display system comprising four or more primary colours (also referred to as primaries), based on a signal from a display generator comprising a smaller number of primaries. Thus a wider gamut is obtained for the colour representation on such a display system.

Classic cathode-ray tube technology allows us to reproduce colours on a display system with the aid of three primary colours, usually red (R), green (G) and blue (B). The maximum colour gamut of such a display system is defined by a triangle which is spanned in a CIE chromaticity diagram by the location of the colour coordinates of its three cathode ray tube phosphors R, G and B. This colour gamut, however, is always quite considerably smaller than the total visible colour space, and many colours occurring in nature can therefore not be represented on a classic display system. These colours are referred to as "out-of-gamut" colours.

This limited colour representation by means of a classic colour display system is one of the problems which, inter alia, only permits partial softproofing, i.e. the representation on a display system of what is to be printed. The aim, after all, is for the picture visible on the display system to correspond as closely as possible to the printed picture.

Other fields where a wider gamut is of interest for a display system are all those applications where the aim is to obtain as natural as possible a representation of an original as, for example, in the case of digital cinema, digital photography, printing systems for textiles etc.

These issues will become even more critical in future as a result of the increasing popularity of the wide gamut colours such as, for example, the so-called HIFI® colours. These employ colorants which are able to generate very highly saturated colours. These colours are always outside the colour gamut of a classic display system, and pictures with such a colour will consequently be represented very poorly on such a system.

Choosing a type of phosphor other than red, green or blue as the third primary colour for a classic display system permits some improvement of the colour representation in a particular region of the colour spectrum, but has the drawback that the colour representation in another region will become poorer. In fact, the result of this method is that the colour triangle, which represents the colour gamut of the display system, is simply shifted in the CIE chromaticity diagram.

Classic cathode-ray tubes comprising more than three primary colours might be able to provide a solution, but because of the low efficiency of an additional phosphor, as well as the more difficult deflection problems (four beams have to converge) this approach is not really feasible.

Existing application software mostly works with three primary colours, certainly as far as the display section is concerned. For high-end page layout systems, there are a number of solutions which are able to perform a separation in terms of four (CMYK, i.e. cyan, magenta, yellow and black) or more primaries as regards printing, for example as described in EP-A-0 586 139. With these systems the multidimensional conversions are very slow, and use has to be made of special hardware so as to considerably accelerate the algorithms. Such methods are not suitable for driving a display system comprising four or more primary colours, since they are too slow to allow the user to see an immediate result.

The international patent application WO 95/10160 describes a method for decoding a signal which describes a video picture as a function of a number of independent system primaries to produce a signal which describes the same video picture as a function of more independent display primaries.

A first step in the method described there consists in the various display primaries being selected in such a way that an improved colour gamut is obtained. Then, the signals entering the display need to be converted into signals for driving each of the selected display primaries. This is tantamount to solving a system with more unknowns than equations, which generally provides an infinite number of possible solutions for depicting a particular colour within the new gamut. So as to generate a unique set of drive voltages in accordance with the incoming signals, somewhat arbitrary additional conditions are imposed.

To this end, the colour polygon which specifies the colour gamut of the display comprising a plurality of primaries is split into overlapping and non-overlapping triangles which are formed by groups of three primaries at a time.

The use of non-overlapping triangles may cause problems if the implementation of the arithmetic units has not been carried out with sufficient accuracy. Noise may then cause rapid jumping between adjoining triangles.

To prevent this it is possible, according to said patent application, to employ overlapping triangles. Hysteresis is relied upon to ensure that jumping between different triangles (i.e. the driving of display primaries different from the original one, even if that is not strictly necessary) is prevented as far as possible.

The received video signal is converted, via matrix computations which are carried out in matrix units, into drive signals for each of the primaries which form a triangle, this being done for each of the triangles which make up the system. A logical unit is linked to each matrix unit and examines the output signals of each of them and selects a particular set which contains only positive drive signals. These drive signals are then used to drive the display primaries.

The matrix computations described in the above invention are very complex.

In BE-A-532363 is disclosed a method for realising a coloured picture by juxtaposition of different coloured images, which are each represented by different groups of display primaries, each group of display primaries being sufficient for representing almost each of the colours to be reproduced. In an example a signal has been coded which describes a picture as a function of three tristimulus values to produce a signal which describes the picture as a function of 9 independent display primaries. The 9 independent display primaries are divided into 3 trichromatic systems, each comprising three primary colours. Each primary colour for one trichromatic system is a secondary colour for each of the other trichromatic systems. For reproducing a colour by means of three trichromatic systems, three different reproductions are obtained, which are combined afterwards. This means that it may be possible that an "out-of-gamut" colour is not reproduced as accurately as it should, but that it is reproduced as an additive composition of different colours. Furthermore, for a system comprising 9 independent display primaries, 9 channels need be provided for transmitting the drive signals to a display. This means that the method described cannot be used on existing systems presenting only three channels for transmitting the drive signals.

The present invention relates to a method for coding a signal which describes a picture as a function of three tristimulus values (X, Y, Z), or some other representation associated therewith, to produce a signal which describes the same picture as a function of four or more independent display primaries. The use of more than three display primaries has the advantage that a wider colour gamut is possible.

The present invention also relates to the coding device for applying the method for coding a signal as described hereinabove.

The coding device comprises calculating means for calculating drive signals for the display primaries thereby using a comparison of the location of each colour to be represented with respect to a straight line in the chromaticity diagram, each colour to be represented being given as a function of three tristimulus values. The calculating means deliver the drive signals, a number of which are mutually exclusive.

The coding device furthermore comprises k channels for transmitting the picture as a function of the n display primaries to a display system.

Application software for creating or manipulating graphic images usually stores a CIELab picture or a picture which can be converted into a CIELab picture in the memory of the computer and then converts this into three RGB display primaries which are stored on a display generator. This RGB picture is applied to the inputs of a display system which converts this picture into drive signals for its three primary colours R, G and B.

According to the invention, for example, a CIELab picture (or a picture described in some other CIE-recognized colour space which is in a normal and standardized relationship to the CIE (X, Y, Z) base system) is converted into four or more display primaries which are then coded on a number of channels so as to be transmitted to the display system. The invention comprises both the method for moving from three to n display primaries, and the method for coding the n display primaries on the various channels which possibly exist already.

The present invention also comprises both a coding device for moving from three to n display primaries, including means for coding the n display primaries on the various channels which possibly exist already, as well as a display system for decoding and representing the different colours by use of more than three display primaries.

Hereinafter, the calculations, by way of example, are based on a CIELab signal. Conversions of signals based on a different colour space are carried out analogously.

The formulae below give, in a simplified manner, the relationship between the CIELab signal of a colour and the tristimulus value (X, Y, Z) of that same colour:

$$L = 116 * \left(\frac{Y}{Y_n}\right)^{\frac{1}{3}} - 16 \quad (1)$$

$$a = 500 * \left[\left(\frac{X}{X_n}\right)^{\frac{1}{3}} - \left(\frac{Y}{Y_n}\right)^{\frac{1}{3}}\right]$$

$$b = 200 * \left[\left(\frac{Y}{Y_n}\right)^{\frac{1}{3}} - \left(\frac{Z}{Z_n}\right)^{\frac{1}{3}}\right],$$

where $(X_n, Y_n, Z_n)$ represent the tristimulus values of the reference white.

Conversion of a CIELab signal to the corresponding tristimulus values (X, Y, Z) then takes place by the system (1) being converted to:

$$Y = Y_n * \left(\frac{L+16}{116}\right)^3 \quad (2)$$

$$X = X_n * \left[\left(\frac{a}{500}\right) + \left(\frac{Y}{Y_n}\right)^{\frac{1}{3}}\right]^3$$

$$Z = Z_n * \left[\left(\frac{Y}{Y_n}\right)^{\frac{1}{3}} - \left(\frac{b}{200}\right)\right]^3.$$

On the basis of the tristimulus values (X, Y, Z) it is then necessary to calculate the drive value which is required for driving each of the primary colours. In the case of the wide gamut display system according to the invention, the tristimulus values (X, Y, Z) therefore have to be split up over more than three primary components. Call these R, G, B, D1, ..., Ds, where D1, ... Ds are the supplementary display primaries.

The solution to this problem is not simple, since we have an overdimensioned system which therefore allows an infinite number of solutions. In other words: infinitely many different combinations of R, G, B and D1, ... ,Ds are possible which will all result in one and the same CIELab colour.

We therefore impose additional conditions which allow one particular R, G, B, D1, ..., Ds combination to be chosen which will result in a well-defined CIELab colour.

For the conversion of the tristimulus values (X, Y, Z) to R, G, B, D1, ..., Ds we first devise a mathematical model which represents the colour rendition in a wide gamut display system.

The relationship between the tristimulus values (X, Y, Z) and the luminances $Y_R Y_G Y_B Y_{D1} \ldots Y_{Ds}$ of the red, green, blue and supplementary display primaries is as follows:

$$\begin{bmatrix} X \\ Y \\ Z \end{bmatrix} = \begin{bmatrix} \frac{x_r}{y_r} & \frac{x_g}{y_g} & \frac{x_b}{y_b} & \frac{x_{d1}}{y_{d1}} & \cdots & \frac{x_{ds}}{y_{ds}} \\ 1 & 1 & 1 & 1 & \cdots & 1 \\ \frac{z_r}{y_r} & \frac{z_g}{y_g} & \frac{z_b}{y_b} & \frac{z_{d1}}{y_{d1}} & \cdots & \frac{z_{ds}}{y_{ds}} \end{bmatrix} * \begin{bmatrix} Y_R \\ Y_G \\ Y_B \\ Y_{D1} \\ \vdots \\ Y_{Ds} \end{bmatrix}, \quad (3)$$

where $(x_r, y_r, z_r)$ are the display chromaticities of the red display primary, $(x_g, y_g, z_g)$ are the display chromaticities of the green primary, $(x_b, y_b, z_b)$ are the display chromaticities of the blue primary and $(x_{d1}, y_{d1}, z_{d1}), \ldots, (x_{ds}, y_{ds}, z_{ds})$ are the display chromaticities of the supplementary display primaries.

We impose the additional requirement that a number of the display primaries be mutually exclusive in sets of two, in other words that they will never be driven simultaneously. Two display primaries are mutually exclusive if the line segment connecting these two display primaries in the CIE chromaticity diagram is intersected by a line segment which connects two mutually non-exclusive display primaries.

The method according to the invention is characterized in that, for each colour to be represented, drive signals for the display primaries are calculated via a comparison of the location of that colour to be represented with respect to a straight line in the chromaticity diagram, and in that a number of said drive signals are mutually exclusive.

Thus, for each pixel $(L_i, a_i, b_i)$ we obtain drive signals for the display primaries. An advantage of working with mutually exclusive signals is that the existing systems comprising three channels for transmitting signals to the display primaries can be retained, even for the systems according to the invention which have more than three display primaries.

Preferably, the number of channels for transmitting signals does not exceed the number of display primaries.

If the number of channels for transmitting signals is smaller than the number of display primaries, different signals have to be multiplexed. This can be done in various ways.

If analog signals are being used, the process of mutually exclusive signals being combined into one signal can be carried out by multiplexing in the amplitude domain, on at least one channel. This is preferably done as evenly as possible. In the optimum case, the minimum number of display primaries coded per channel is given by [n/k] (=integer division), n being the number of display primaries and k being the total number of channels available for transmitting signals to the display system. The number of channels which carry one more signal than the minimum number is then given by (n mod k) (=remainder on division by k).

Therefore the coding device according to the present invention comprises furthermore at least one multiplexer for combining in the amplitude domain mutually exclusive signals for driving different display primaries.

The process of mutually exclusive analog signals being combined into one signal can be carried out by introducing drive thresholds, specifically one drive threshold fewer on each channel than the number of signals to be combined on that channel. Thus the total resulting signal is split into different components. This is done by splitting means comprised in the coding device. The various mutually exclusive signals which are combined on the same channel are then each allocated to a components of the total resulting signal by the allocating means.

If drive signals for two display primaries are to be combined on one channel, a drive threshold is preferentially set to 50% of the reference white. Thus, if the total signal is, for example, 700 mV (normally 100% of the reference white), the drive threshold is set to 350 mV.

According to another preferred embodiment, a drive threshold is set to 75% of the reference white, if signals for two display primaries are to be coded on one channel. Thus, if the total signal is, for example, 700 mV, the drive threshold is set to 525 mV.

This uneven distribution of the channel over the colours to be transmitted is introduced because experiments show that less resolution is required with respect to certain colours, since the Mac Adam ellipses expand in that direction. Thus, the resolution can be maximized for each colour by experimenting with the location of the drive threshold.

According to yet another preferred embodiment of the invention, signals which are combined on the same channel are alternately combined in inverted and non-inverted form. The result of this is that either the maxima or the minima of two drive signals will converge at a drive threshold, abrupt colour transitions being avoided at points where minima coincide. Therefore the coding device comprises inverting means.

For digital signals, too, the process of mutually exclusive signals being combined into one signal can be carried out by multiplexing in the amplitude domain, by digital coding. In that case the multiplexer of the coding device is a digital multiplexer. It is realistic for a physical implementation of the wide gamut display to be digitally linked to the display generator. Standards are already being produced today for this purpose, such as National's LVDS. In this case too, it will still be useful to multiplex the drive signals for a plurality of display primaries, given the limited available signal bandwidth. An optionally additional bit can be reserved digitally for identifying one of the mutually exclusive signals. The coding device then comprises identification means for identifying the mutually exclusive signals by identifying codes, which are multiplexed into the drive signal.

Yet another option for combining the drive signals is that of multiplexing the various primaries in the time domain. Each picture may then consist of two or more rasters which are generated at double or higher picture repetition rate. According to a preferred embodiment, three channels and at most six display primaries are used. Each picture consists of two rasters which are generated at double picture repetition rate. A first raster then generates the drive signals for three mutually non-exclusive display primaries, a second raster generating drive signals for the three other display primaries. This embodiment is compatible with the current stereo cards which alternately transmit the left-hand and the right-hand image, subject to software changes at the driver level. Using r raster and k channels, at most k.r display primaries can be driven.

In order to be able to combine in the time domain the mutually exclusive signals for driving different display primaries, the coding device comprises at least one multiplexer.

This multiplexer or these multiplexers may be driven by control signals having a frequency which is higher than the picture repetition rate.

Alternatively the multiplexer or multiplexers may be driven by successive vertical syncs.

An advantage of multiplexing in the time domain is that there is no loss of resolution and that colorimetrically uninteresting transmissions are avoided.

According to a preferred embodiment, the method of the invention is implemented by the following steps:

a) From the n display primaries (n>3), three are chosen, referred to as principal primaries; the remaining (n−3) display primaries are referred to as the auxiliary primaries. Preferably (but not necessarily) the choice of the main and auxiliary primaries is carried out in such a way that the locations of the auxiliary primaries are distributed as evenly as possible between the principal primaries.

b) The straight lines which pass through two of the principal primaries at a time are defined as principal straight lines; a principal straight line is associated with an auxiliary primary if said auxiliary primary and the intersection of the two other principal straight lines are each situated on different sides of the principal straight line associated with the auxiliary primary.

c) The coordinates of the point to be represented, expressed as a function of the three tristimulus values (X, Y, Z), are converted into coordinates $(x_i, y_i)$ in the CIE chromaticity diagram.

d) The position of the point $(x_i, y_i)$ to be represented in the chromaticity diagram is compared with the position of an as yet unconsidered auxiliary primary with respect to the principal straight line which is associated with said auxiliary primary. This is done by substituting the coordinates of the point $(x_i, y_i)$ to be represented and that of the auxiliary primary into the equation of the principal straight line under consideration.

e) If the two compared points are situated on different sides of the principal straight line under consideration (in other words, if the substitution of the coordinates of the two points into the equation of the straight line according to step d) gave results of different sign), and if the auxiliary primary was not the (n−3)th with which the comparison was being performed, the procedure returns to step d).

f) If the two compared points are situated on different sides of the principal straight line under consideration (in other words, if the substitution of the coordinates of the two points into the equation of the straight line according to step d) gave results of different sign), and if the auxiliary primary under consideration was the (n−3)th with which the comparison was being performed, the point $(x_i, y_i)$ to be represented is represented by the three principal primaries, and the procedure then moves to step j).

g) If the point $(x_i, y_i)$ to be represented is located on the principal straight line (in other words, if the substitution of the coordinates of the point $(x_i, y_i)$ to be represented into the equation of the straight line in step d) gave zero as a result), the point $(x_i, y_i)$ to be represented is represented by the three principal primaries, and the procedure then moves to step j).

h) If the auxiliary primary under consideration and the point $(x_i, y_i)$ to be represented are both located on the same side of the principal straight line under consideration (in other words, if the substitution of the coordinates of the two points into the equation of the straight line according to step d) gave results of identical sign), and if only one auxiliary primary is associated with the principal straight line, the point $(x_i, y_i)$ to be represented is represented by the auxiliary primary and the two principal primaries which define the principal straight line under consideration, and the procedure then moves to step j).

i) If the auxiliary primary under consideration and the point $(x_i, y_i)$ to be represented are both located on the same side of the principal straight line under consideration (in other words, if the substitution of the coordinates of the two points into the equation of the straight line according to step d) gave results of identical sign), and if a plurality of auxiliary primaries are associated with the principal straight line under consideration, the two principal primaries which define the principal straight line and the various auxiliary primaries which are associated with said principal straight line, are regarded as a subsystem. The two primaries which were principal primaries in the higher-level system, are still principal primaries in the subsystem, and from the various auxiliary primaries a new, third principal primary is chosen. A new n is introduced, being the number of primaries which form part of this subsystem, whereupon step b) is again applied to the primaries of this subsystem.

j) If (n−k)>0, n being the number of display primaries and k being the number of channels, mutually exclusive signals are multiplexed, if necessary, in the amplitude or in the time domain.

Therefore the calculating means of the coding device comprises conversion means, selection means and drive-calculating means.

The conversion means converts the coordinates of each color point in function of the three tristimulus values (X, Y, Z) into coordinates $(x_i, y_i)$ in the chromaticity diagram.

The selection means selects for each point $(x_i, y_i)$ in the chromaticity diagram the display primaries which will represent the colour point. Said selection is carried out by comparison of the location of the colour point in the chromaticity diagram with respect to a straight line in said chromaticity diagram. Said comparison is either used to calculate on-the-fly the drive signals for the display primaries, or to fill a LUT containing for each colour point the display primaries which need be driven for representing said colour.

The drive-calculating means calculates the drive signals for each display primary. Said drive-calculating means receives as input both the coordinates $(x_i, y_i)$ of the colour point in the chromaticity diagram and the output of the selection means.

Step a) of the method may be preceded by the mapping of the "out-of-gamut" colours onto the edge of the colour polygon, the convex polygon which, in the CIE chromaticity diagram, is formed by the location of the display primaries. This can be done using techniques known from the literature.

Therefore the coding device comprises mapping means.

After the various signals have been multiplexed, they can be transmitted to a display system via the k different channels, where they are split so as to drive each of the separate display primaries. Said splitting can be effected by means of a simple threshold circuit, if multiplexing took place in the amplitude domain, or by time demultiplexing if multiplexing took place in the time domain.

The present invention also relates to a display system comprising four or more primaries, which is suitable for receiving signals which are combined on one channel. Such a display system is equipped, inter alia, with an input circuit, one or more splitter circuits and a screen.

The input circuit is suitable for receiving the input signals which have been coded in the form of combined signals for driving n display primaries.

The task of the splitter circuits is to split those combined input signals into their components, thus forming n drive signals for driving the n different display primaries. The number of splitter circuits present in a display system according to the invention is defined by the number of channels on which different drive signals for display primaries are combined.

Preferably, the splitter circuits are analog or digital threshold circuits (depending on whether the drive signals are analog or digital), which split the combined signals into their components by clipping the combined signals to the drive threshold.

On the screen, a picture is represented with the aid of the n primary colours.

The present invention also relates to a display system comprising four or more primaries, which is suitable for receiving signals which are time-multiplexed. Such a display system is equipped, inter alia, with an input circuit, a demultiplexing system and a screen.

The input circuit is suitable for receiving the time-multiplexed input signals for driving n display primaries.

The demultiplexing system converts these time-multiplexed signals into signals for driving each of the n different display primaries.

On the screen, the picture is represented with the aid of the n primary colours.

Both display systems according to the invention produce a wide gamut colour display which can be driven from a classic display generator (for example a graphics card) comprising three primary channels.

Such a wide gamut display system according to the invention, both the one suitable for receiving signals which are multiplexed in the amplitude domain and the one suitable for receiving signals multiplexed in the time domain, can readily be switched to a standard colour display via a wide gamut colour switch on said display system, which optionally switches off the drive threshold automatically. When the drive threshold has been switched off, pixels can then only be represented with the aid of the three principal primaries of the system. Thus, very simple compatibility with existing display systems can be achieved.

The present invention will be explained in more detail with reference to the figures, in which FIG. 3a shows how a signal can be located on a channel, FIG. 3b shows two signals which are combined on the same channel as a result of a drive threshold being introduced, and FIG. 3c shows two signals which are combined on the same channel as a result of a drive threshold being introduced, but with one of the signals being inverted, FIG. 7a shows how the non-inverted signals are located on a channel, FIG. 7b shows how signals which are alternately inverted and non-inverted, can be located on one channel.

Figure 1:
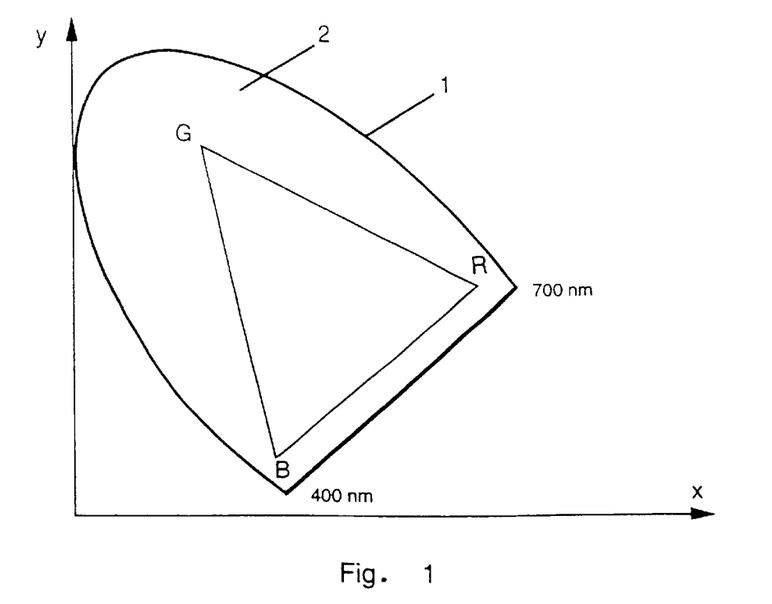
FIG. 1 represents a CIE diagram which depicts the maximum colour gamut of a display system comprising three primary colours, as found in the prior art.

FIG. 1 represents a CIE chromaticity diagram. This is a two-dimensional representation of the x and y colour coordinates, at the origin of the Y-axis, Y being the luminance function. The complete visible spectrum, comprising wavelengths from 360 nm to 830 nm, is represented in this diagram as a horseshoe-shaped curve 1. This encloses an interior 2 which represents all the possible colours composed from a spectrum of spectral colours.

If two fundamental colours are chosen arbitrarily within the horseshoe-shaped curve 1, it is possible, by additive mixing of these two fundamental colours, to reach any point on the line segment which, in the CIE diagram, links the two points representing the fundamental colours chosen. If three fundamental colours are chosen, any point within the triangle spanned by the representation of those three fundamental colours in the CIE chromaticity diagram for Y=0 can be reached. For other values of the luminance function, the area representing the colour gamut in the CIE chromaticity diagram is often smaller.

A classic display system comprising three primary colours red (R), green (G) and blue (B) consequently is able to reproduce only those colours which are located within the colour triangle RGB spanned by the representation of the three primary colours R, G and B in the CIE chromaticity diagram.

Similarly, a colour display comprising four display primaries R, G, B and D (see FIG. 2) is able to reproduce those colours (and only those colours) which are located within the convex colour polygon, RGDB.

Figure 2:
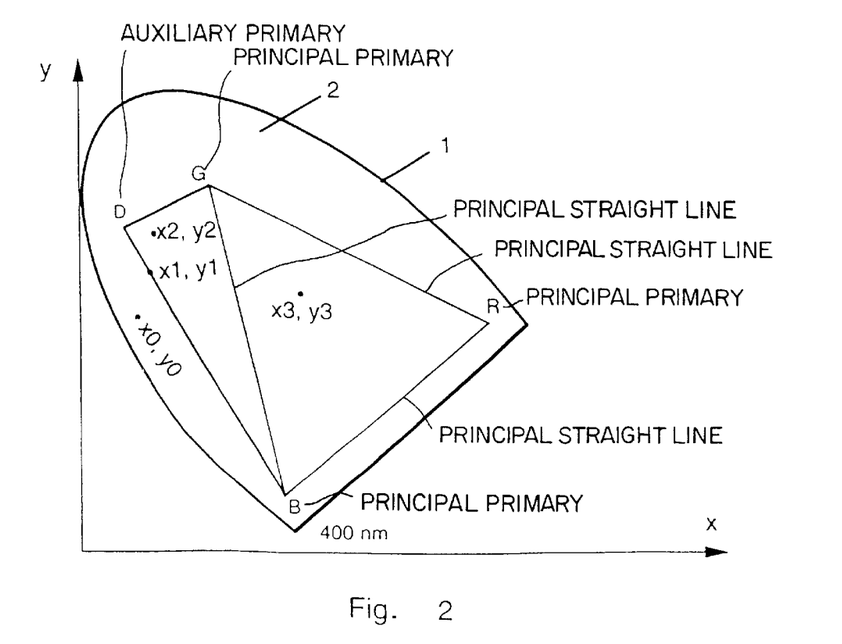
FIG. 2 represents a CIE diagram which depicts the colour gamut of a display system comprising four primary colours, according to the invention.

There now follows a detailed discussion, by way of example, of a number of special cases:

Case n=4, k=3 (FIG. 2)

The situation is that, starting from a system comprising three tristimulus values (X, Y, Z), we move to a system comprising four display primaries (R, G, D, B). The coded signals are transmitted via three channels.

[n/k]=[4/3]=1, i.e. each of the three channels, in the course of coding, carries signals for at least one display primary.

(n mod k)=(4 mod 3)=1, i.e. one of the three channels, in the course of coding, carries signals for two display primaries.

In the CIE chromaticity diagram, the location of the four display primaries R, G, B and D can be found. The colour gamut of a display system comprising these four display primaries R, G, B and D is given by all the points within the convex quadrangle BRGD.

From the tristimulus values $(X_i, Y_i, Z_i)$ of a well-defined point to be represented we calculate the normalized coordinates:

$$x_i = \left(\frac{X_i}{X_i + Y_i + Z_i}\right)$$

$$y_i = \left(\frac{Y_i}{X_i + Y_i + Z_i}\right)$$

By way of example, we will now consider, in the CIE diagram of FIG. 2, the points $(x_0, y_0)$, $(x_1, y_1)$, $(x_2, y_2)$ and $(x_3, y_3)$ to be represented.

If the point $(x_0, y_0)$ to be represented is "out-of-gamut" (i.e. outside the quadrangle described by the display primaries R, G, B and D), it can be mapped, by means of techniques known from the literature, onto the edge of said quadrangle before the procedure is continued. It then ends up, for example, at the point $(x_1, y_1)$ to which the normal method of the invention can be applied, as will be described hereinafter. Said mapping is not a necessary condition for the application of the method according to the invention, but it will certainly produce a more accurate final result.

As the principal primaries we choose the display primaries R, G and B, and as the auxiliary primary the display primary D. The principal straight line associated with the auxiliary primary D is the straight line GB through the principal primaries G and B. After all, the auxiliary primary D and the intersection R of the principal straight lines RG and BR each lie on different sides of the principal straight line GB.

We will now determine which of the display primaries R, G, B and D should be driven so as to display on the display system the various points $(x_1, y_1)$, $(x_2, y_2)$ and $(x_3, y_3)$ to be represented.

The location of the point $(x_2, y_2)$ to be represented is compared with the location of the auxiliary primary D, this being done with respect to the principal straight line GB which is associated with the auxiliary primary D.

The comparison of the location of a point $(x_i, y_i)$ to be represented with the location of the auxiliary primary D is carried out by the coordinates of the point $(x_i, y_i)$ to be represented and the coordinates of the auxiliary primary D being substituted into the equation of the principal straight line GB:

$$y' = y_b + \left(\frac{y_g - y_b}{x_g - x_b}\right) * (x_i - x_b) - y_i$$

$$y'' = y_b + \left(\frac{y_g - y_b}{x_g - x_b}\right) * (x_D - x_b) - y_D$$

As a result of the sign of y' and the sign of y'' being compared with one another, the location of the point $(x_i, y_i)$ to be represented is being compared with the location of the auxiliary primary D with respect to the principal straight line GB which is associated with the auxiliary primary D.

$$\text{If } \begin{matrix} y'y'' \geq 0 \\ y'y'' < 0 \end{matrix} \text{ we postulate } \begin{matrix} Y_R = 0 \\ Y_D = 0 \end{matrix}$$

This means that we have imposed a fourth condition on our system.

The auxiliary primary and the point $(x_2, y_2)$ to be represented are situated on the same side of the principal straight line GB (y'y''≧0) and the point $(x_2, y_2)$ to be represented is therefore coded with the aid of the display primaries G, B and D. Drive signals for the point $(x_1, y_1)$ to be represented are likewise determined in this way.

Had we not previously mapped the point $(x_0, y_0)$ onto the edge of the quadrangle, both points, on comparison of the location of $(x_0, y_0)$ with display primary D with respect to the principal straight line GB, would have been found to be situated on the same side. Consequently, the point $(x_0, y_0)$ to be represented will likewise be coded with the aid of the display primaries G, D and B. However, calculation of the drive signals produces negative values for G. These are processed by means of techniques known from the literature. If required, the signal can be clipped to 0.

The auxiliary primary D and the point $(x_3, y_3)$ to be represented are each situated on different sides of the principal straight line GB (y'y''<0), and D is the last (i.e. only) auxiliary primary required for comparison, and the point $(x_3, y_3)$ to be represented is therefore coded with the aid of the display primaries G, B and R.

The drive signals for the representation of the points $(x_0, y_0)$, $(x_1, y_1)$, $(x_2, y_2)$ and $(x_3, y_3)$ are uniquely defined.

Since $Y_D$ and $Y_R$ are not being driven simultaneously, we therefore obtain, depending on the location of the point $(x_i, y_i)$:

$$\begin{bmatrix} Y_R \\ Y_G \\ Y_B \end{bmatrix} = \begin{bmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{bmatrix}^{-1} * \begin{bmatrix} X_i \\ Y_i \\ Z_i \end{bmatrix} \text{ if } Y_D = 0$$

or $$\begin{bmatrix} Y_D \\ Y_G \\ Y_B \end{bmatrix} = \begin{bmatrix} \frac{x_d}{y_d} & \frac{x_g}{y_g} & \frac{x_b}{y_b} \\ 1 & 1 & 1 \\ \frac{z_d}{y_d} & \frac{z_g}{y_g} & \frac{z_b}{y_b} \end{bmatrix}^{-1} * \begin{bmatrix} X_i \\ Y_i \\ Z_i \end{bmatrix} \text{ if } Y_R = 0$$

Display primaries R and D are mutually exclusive (they are never being driven simultaneously) and are combined into one signal. This means that the channel which transmits the signal for the primary R to the display system will also transmit the signal for the primary D.

This is preferably done by splitting the channel into two parts by introducing a drive threshold. If the total range of the channel is from 0 to $V_{max}$ (see FIG. 3a), one signal will normally be coded thereonto, so that the minimum value of that signal corresponds to the 0 and the maximum value for that signal corresponds to $V_{max}$. If a drive threshold TH1 is now introduced (see FIG. 3b), the signal from 0 to TH1 can for example be allocated to the signal for minimum driving of R to maximum driving of R, whereas the signal from TH1 to $V_{max}$ is allocated to the signal for minimum driving of D to maximum driving of D.

Figure 3:
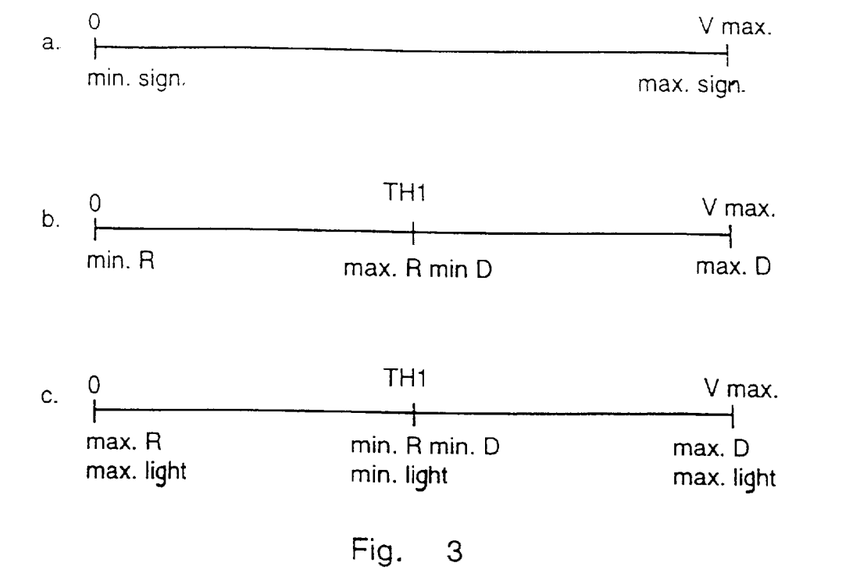
FIG. 3 is a representation of how signals can be coded on a channel.

One of the two signals, however, may alternatively be controlled inversely, for example the signal for driving display primary R (see FIG. 3c). In that case the signal from 0 to TH1 is allocated to the signal for maximum driving of R to minimum driving of R, whereas the signal from TH1 to $V_{max}$ is allocated to the signal for minimum driving of D to maximum driving of D. This has the advantage that the signal transitions for driving colours, which are situated around the principal straight line GB, are less large, since minimum driving of R and minimum driving of D correspond to colours which are located next to one another in the colour plane.

At first sight, application of the method according to the invention has the drawback that the resolution for red drops by half, since drive signals for display primary R and for display primary D are coded on the same channel. Since, however, we are increasing the colour gamut of the display system by introducing a fourth display primary, more colours are present, as it were, with the same digital resolution. The locations of these colours are distributed over a larger colour quadrangle. Among the 16 million colours which we were previously able to generate with the aid of the three display primaries, there were only a few million which we were able to distinguish. In perceptual terms, the locations of the colours are now distributed somewhat more effectively.

The method as applied hereinabove acts on the R-D signal. Alternatively, we could choose, for example the display primaries R, D and B as the principal primaries and the display primary G as the auxiliary primary. With this method, the display primaries B and G are mutually exclusive, so that their drive signals are combined on one channel. This has the advantage that the direction of the B-G axis is much closer to that of the Mac Adam ellipses than that of the R-D axis, so that optimum use can be made of the available resolution. The drawback of this monitor is that it is less easily switched over into a classic monitor, since switching off the auxiliary primary G results in a system with three display primaries R, D and B, which is not the classic set up.

Case n=4, k=4

The situation is that, starting from a system comprising three tristimulus values (X, Y, Z), we move to a system comprising four display primaries. The coded signals are transmitted via four channels.

[n/k]=[4/4]=1, i.e. each of the four channels, in the course of coding, carries signals for at least one display primary.

(n mod k)=(4 mod 4)=0, i.e. none of the four channels, in the course of coding, carries signals for more than one display primary.

k−3=4−3=1, i.e. one auxiliary primary is coded on a separate channel.

Determining which display primaries should be driven in order to display the point ($x_i$, $y_i$) to be represented on the display system is carried out in exactly the same manner as in the previous case (n=4, k=3). Now, however, each of the drive signals for the display primaries R, G, B and D is transmitted via a separate channel, even though (for example) R and D are mutually exclusive.

Figure 4:
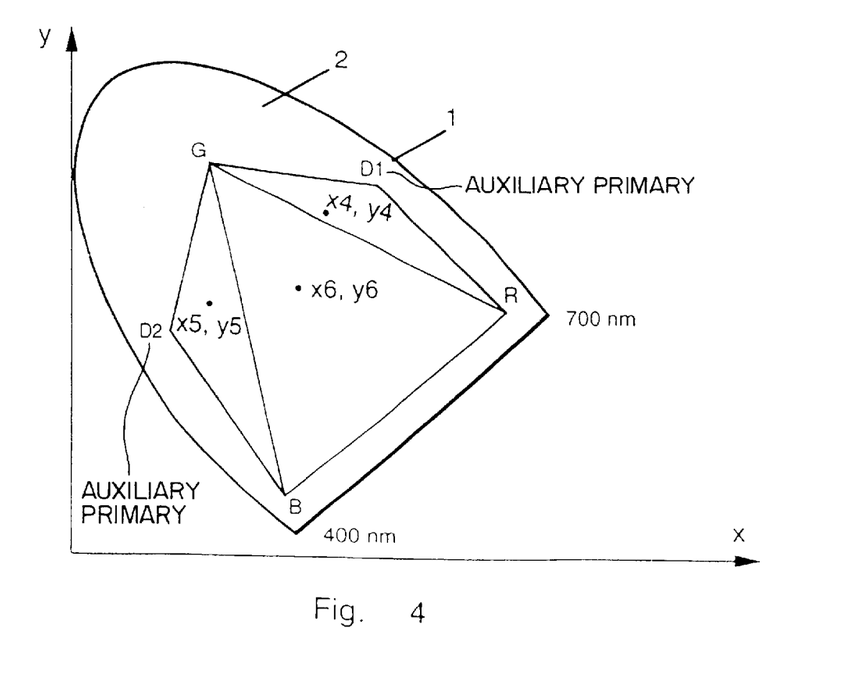
FIG. 4 is a representation of a preferred embodiment of the method which is used in the present invention, in the case of five display primaries being used.

Case n=5, k=3 (FIG. 4)

Starting from a system comprising three tristimulus values (X, Y, Z), we move to a system comprising five display primaries. The coded signals are transmitted via three channels.

[n/k]=[5/3]=1, i.e. each channel, in the process of coding, carries at least one signal for one display primary.

(n mod k)=(5 mod 3)=2, i.e. two of the three channels carry two display primaries each.

There are five display primaries R, G, B, D1 and D2, which, in a CIE chromaticity diagram, are located in accordance with the vertices of a convex pentangle. The colour gamut of a display system comprising these five display primaries R, G, B, D1 and D2 is given by all the points which are located within the convex pentangle RD1GD2B.

From these display primaries, three principal primaries R, G and B are chosen, preferably in such a way that the locations of the two (=n−3) remaining display primaries D1 and D2 are distributed as evenly as possible between the principal primaries chosen, i.e. not more than one auxiliary primary is situated between two principal primaries. For example, choose D1 between R and G, and D2 between G and B.

The straight lines RG, GB and BR are the straight lines formed by the principal primaries R, G and B. These are referred to as principal straight lines.

The principal straight line RG is associated with auxiliary primary D1, and the straight line GB is associated with auxiliary primary D2.

The coordinates of the point to be represented as a function of the three tristimulus values (X, Y, Z) are converted into coordinates ($x_i$, $y_i$) in the chromaticity diagram.

We determine which primaries have to be driven in order to represent the points ($x_4$, $y_4$), ($x_5$, $y_5$) and ($x_6$, $y_6$) on the display system.

The location of the point ($x_4$, $y_4$) to be represented is compared with the location of the first auxiliary primary D1 with respect to the principal straight line RG associated with D1, by the coordinates of the two points being substituted into the equation of the straight line RG and comparing the signs of the two results.

The two points are located on the same side of RG (the signs of the two results are identical), and the point ($x_4$, $y_4$) to be represented is displayed on the display system with the aid of the display primaries R, G and D1.

In order to display the point ($x_5$, $y_5$) to be represented on the display system, the location of this point is compared with the location of the first auxiliary primary D1 with respect to the principal straight line RG associated with D1. Both points are located on different sides of said principal straight line RG (the signs of the results of the substitution of the coordinates of the two points to be compared into the equation of the straight line RG differ), and D1 is not the last (n−3rd=2nd) auxiliary primary which was used for the comparison. Consequently, the location of the point ($x_5$, $y_5$) to be represented is then compared with the location of the next auxiliary primary D2, specifically with respect to the principal straight line GB associated with that auxiliary primary D2. Both points are located on the same side of the principal straight line GB (the signs of the results of the substitution of the coordinates of the two points to be compared into the equation of the straight line GB are identical), and the point ($x_5$, $y_5$) to be represented is displayed with the aid of the display primaries G, B and D2.

In order to display the point ($x_6$, $y_6$) to be represented on the display system, the same method used as described above for displaying the point ($x_5$, $y_5$) to be represented, as far as the comparison of the location of the point ($x_6$, $y_6$) to be represented with the auxiliary primary D2. Now, the two points are located on different sides of the principal straight line GB under consideration (the signs of the results of substituting the coordinates of the two points to be compared into the equation of the straight line GB are different). No auxiliary primaries not yet considered remain, so the point ($x_6$, $y_6$) to be represented is displayed on the display system with the aid of the display primaries R, G and B.

The drive signals for B and D1 are mutually exclusive, as are those for R and D2.

Three channels are at our disposal for transmitting the signals to the display system. The mutually exclusive drive signals for B and D1 are combined on one channel, and the mutually exclusive drive signals for R and D2 are combined on another channel. The third channel is used exclusively for accommodating the drive signal for G.

Case n=5, k=4

As in the previous case, we move from a system comprising three tristimulus values (X, Y, Z) to a system comprising five display primaries. Now, however, the drive signals can be coded on four channels.

[n/k]=[5/4]=1, i.e. each of the four channels, in the process of coding, carries at least one signal for one display primary.

(n mod k)=(5 mod 4)=1, i.e. one of the four channels carries two display primaries.

k−3=4−3=1, i.e. one auxiliary primary is coded on a separate channel.

The method for determining which display primaries have to be driven for a particular pixel to be represented is precisely the same as that discussed in the previous case (n=5, k=3), except that the drive signals for the various display primaries are combined in a different manner.

Again, the display primaries B and D1, and R and D2, respectively, are mutually exclusive. One of the two auxiliary primaries D1 or D2 is put on a separate channel. In the first case (auxiliary primary D1 on a separate channel), the principal primaries B and G are each put on a separate channel, and the drive signals for R and D2 are combined on one channel. In the second case (auxiliary primary D2 on a separate channel), the principal primaries R and G are each put on a separate channel, and the drive signals for B and D1 are combined on one channel.

Figure 5:
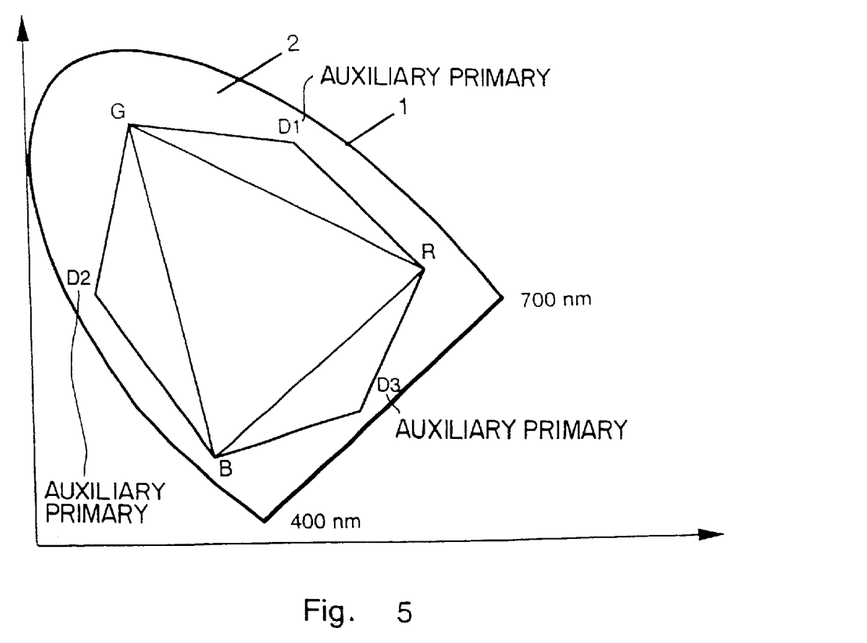
FIG. 5 is a representation of a preferred embodiment of the method which is used in the present invention, in the case of six display primaries being used.

Case n=6, k=3 (FIG. 5)

We move from a system comprising three tristimulus values (X, Y, Z) to a system comprising six display primaries. The drive signals can be coded on three channels.

[n/k]=[6/3]=2, i.e. each of the three channels, in the process of coding, carries signals for at least two display primaries.

(n mod k)=(6 mod 3)=0, i.e. none of the channels, in the process of coding, carries signals for more than two display primaries.

In the CIE chromaticity diagram, the location of the six display primaries R, G, B, D1, D2 and D3 can be found. The colour gamut of a display system comprising these six display primaries R, G, B, D1, D2 and D3 is given by all the points within the convex hexagon RD1GD2BD3.

From the six display primaries, three principal primaries R, G and B are chosen. The other three (=n−3) primaries are the auxiliary primaries D1, D2 and D3. Main and auxiliary primaries are chosen in such a way that exactly one auxiliary primary is located between two principal primaries. D1 is therefore located between and G, D2 is located between G and B and D3 is located between B and R.

The straight lines RG, GB and BR are called principal straight lines. RG is associated with D1, GB is associated with D2 and BR is associated with D3.

The process of determining which primaries have to be driven in order to represent a point having coordinates ($x_i$, $y_i$) is carried out analogously to what has been described in the previously elaborated cases.

In this case, the drive signals for R and D2 are mutually exclusive, as are those for G and D3 and those for B and D1. Since exactly two drive signals are to be combined on each channel, there will in each case be two mutually exclusive signals per channel which are transmitted to the display system.

Instead of the drive signals being multiplexed in the amplitude domain, they can also be multiplexed in the time domain. A first raster is formed by the drive signals of the principal primaries R, G and B, and a second raster is formed by the drive signals of the auxiliary primaries D1, D2 and D3. Both pictures are generated at the double vertical frequency.

Case n=6, k=4

As in the previous case, we move from a system comprising three tristimulus values (X, Y, Z) to a system comprising six display primaries. The drive signals can now be coded on four channels.

[n/k]=[6/4]=1, i.e. each of the four channels, in the process of coding, carries signals for at least one display primary.

(n mod k)=(6 mod 4)=2, i.e. two of the four channels, in the process of coding, carry signals for more than one display primary.

k−3=4−3=1, i.e. one auxiliary primary will be transmitted on a separate channel.

The method for determining which display primaries have to be driven in order to display a point ($x_i$, $y_i$) to be represented on the display system, proceeds in exactly the same way as in the previous case. Only the coding on the various channels is carried out in a different way.

Each of the principal primaries R, G and B is put on a channel, as is one of the auxiliary primaries D1, D2 or D3. Assuming that auxiliary primary D1 is put on a separate channel, the remaining two auxiliary primaries D2 and D3 are combined with the signal with which they are mutually exclusive (i.e. D2 with R and D3 with G). Obviously it is also possible for one of the other auxiliary primaries to be put on a separate channel, which then results in combinations of other mutually exclusive primaries.

Figure 6:
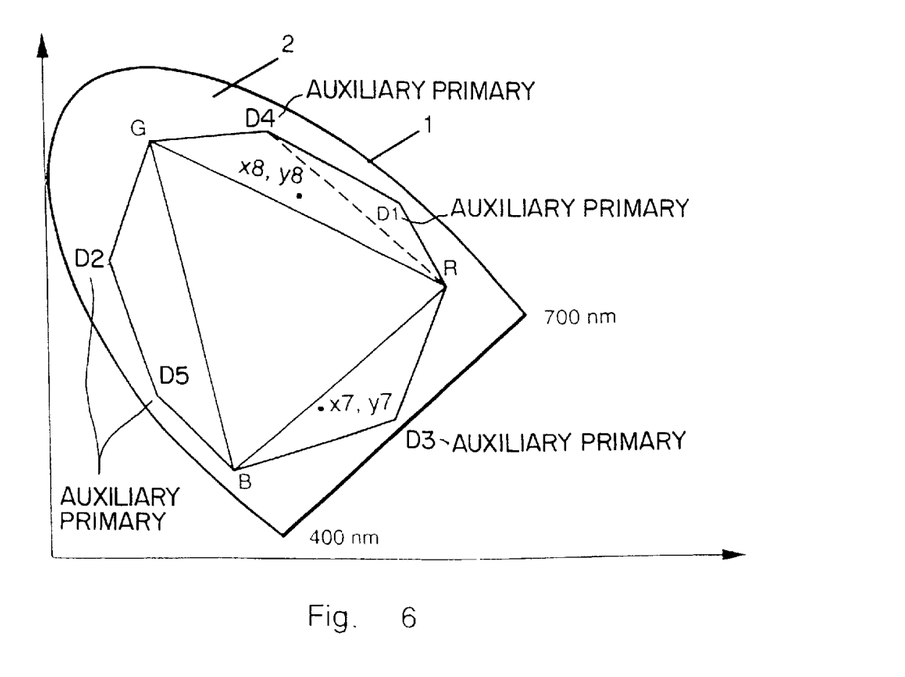
FIG. 6 is a representation of a preferred embodiment of the method which is used in the present invention, in the case of eight display primaries being used.

Case n=8, k=3 (FIG. 6)

Starting from a system comprising three tri-stimulus values (X, Y, Z), we move to a system comprising eight display primaries. The coded signals are transmitted via three channels.

[n/k]=[8/3]=2, i.e. each of the three channels, in the process of coding, carries signals for at least two display primaries.

(n mod k)=(8 mod 3)=2, i.e. two of the three channels, in the process of coding, carry signals for three display primaries.

k−3=0, i.e. not a single auxiliary primary is coded on a separate channel.

In the CIE chromaticity diagram, the location for the eight display primaries R, G, B, D1, D2, D3, D4 and D5 can be found. The colour gamut of a display system comprising these eight display primaries is given by all the points within the convex octagon RD1D4GD2D5BD3.

From the eight display primaries, three principal primaries R, G and B are chosen, preferably in such a way that the locations of auxiliary primaries, these being the remaining display primaries D1 to D5, are distributed as evenly as possible between the principal primaries. D1 and D4 are located between R and G, D2 and D5 between G and B, and D3 is located between B and R.

RG is the principal straight line associated with the auxiliary primaries D1 and D4, GB is the principal straight line associated with the auxiliary primaries D2 and D5, and BR is the principal straight line associated with the auxiliary primary D3.

The coordinates of the point to be represented as a function of the three tristimulus values (X, Y, Z) are converted into coordinates ($x_i$, $y_i$) in the chromaticity diagram.

Let us consider the case of a point ($x_7$, $y_7$) to be represented.

The location of said point ($x_7$, $y_7$) to be represented is compared with the location of the first auxiliary primary D1 with respect to the principal straight line RG associated with D1.

The two points are located on different sides of RG, i.e. the point ($x_7$, $y_7$) to be represented is compared with the location of the next auxiliary primary D4 with respect to the principal straight line RG associated with D4. Again, the two points are on different sides, i.e. we move on to a next auxiliary primary not as yet dealt with. The result is the same, even in the case of comparison, with the location of D2 and D5, but changes with auxiliary primary D3.

The two points ($x_7$, $y_7$) and D3 are on the same side of the principal straight line BR associated with the auxiliary primary D3. The point ($x_7$, $y_7$) to be represented is displayed on the display system with the aid of the display primaries B, R and D3.

The procedures for determining which display primaries have to be driven in order to display the point ($x_8$, $y_8$) to be represented on the display system is as follows.

The location of the point ($x_8$, $y_8$) to be represented is compared with the location of the auxiliary primary D1 with respect to the principal straight line RG associated with D1. The two points are located on the same side of said principal straight line RG, and the principal straight line RG is associated not only with the auxiliary primary D1, but also with auxiliary primary D4. Consequently, the display primaries R, G, D1 and D4 will be regarded as a subsystem.

This subsystem now comprises four display primaries (new n=4). Two of these are the principal primaries G and R. From the other two display primaries D1 and D4 we choose a third principal primary, for example D4. D1 is then the only auxiliary primary of this subsystem which, as its principal straight lines, has RD4, D4G and GR. The principal straight line associated with D1 in this subsystem is the straight line RD4.

The location of the point ($x_8$, $y_8$) to be represented is compared with the location of auxiliary primary D1 with respect to the principal straight line RD4 which, in this subsystem, is associated with auxiliary primary D1. The two points are located on different sides, and D1 is the only auxiliary primary of this subsystem (D1 therefore was the last auxiliary primary with which a comparison had to be carried out in this subsystem), and consequently the point ($x_8$, $y_8$) to be represented is displayed on the display system with the aid of the three principal primaries R, G and D4 of the subsystem.

Determining which display primaries are mutually exclusive and should therefore be combined on the various channels, depends on the choice of the new principal primaries in the respective subsystems. If, in the first subsystem GRD1D4, the auxiliary primary D4 is chosen as the new principal primary, and in the subsystem BGD2D5 the auxiliary primary D5 is chosen as the new principal primary, then the drive signals for R and D5 are mutually exclusive, as are those for G, D1 and D3, and those for B, D2 and D4.

Figure 7:
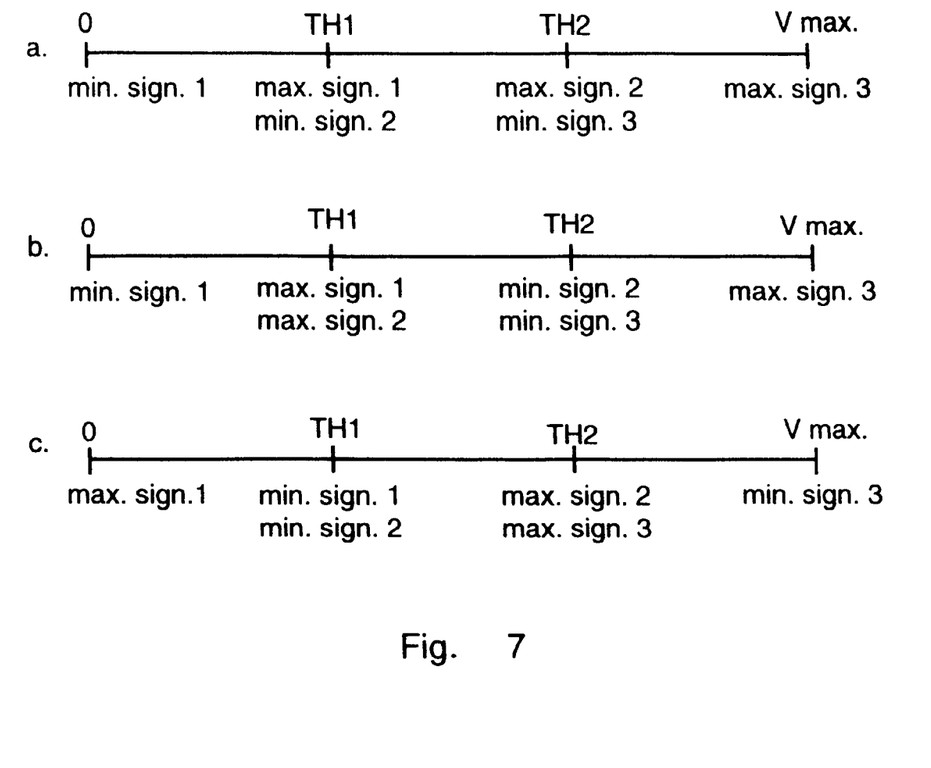
FIG. 7 is a representation of how three signals can be coded on one channel.

In order to combine three signals on one channel, two drive thresholds TH1 and TH2 are introduced, as a result of which the channel is split into three parts. Each part has a drive signal allocated to it (see FIG. 7a).

A preferred embodiment is that in which the signals are combined, on a channel, alternately in inverted and non-inverted form (see FIG. 7b), so that abrupt colour transitions are avoided as far as possible.

Figure 8:
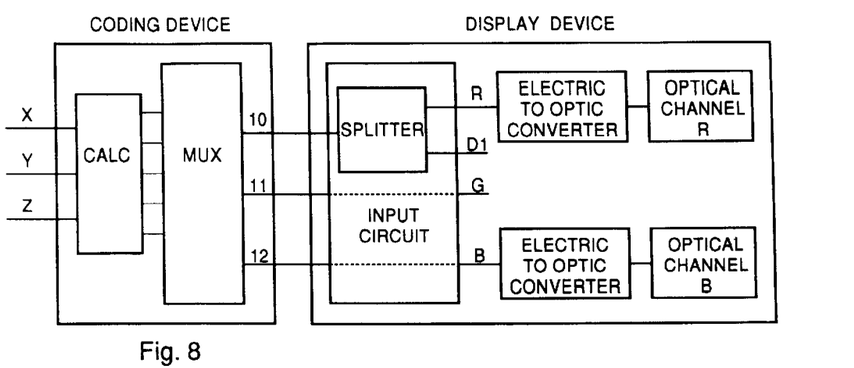
FIG. 8 shows an embodiment comprising both a coding device and a display system, with three channels and four display primaries, applying combination of drive signals on one channel in the amplitude domain.

FIG. 8 shows an embodiment comprising both a coding device and a display system according to case n=4, k=3 discussed hereinabove. The coding device comprises a calculating means CALC, a multiplexer MUX and three channels 10, 11, 12 for transmitting the picture as a function of the four display primaries R, G, B, D1 to the display device. The coding device receives a signal which describes a picture as a function of three tristimulus values X, Y, Z, and produces a signal which discribes the same picture as a function of the four independent display primaries R, G, B, and D1 in the calculating means CALC. Said signal is coded on the three channels 10, 11, 12 of the coding device by means of the multiplexer MUX.

As discussed in case n=4, k=3 hereinabove, preferably each of the three channels 10, 11, 12 carries at least one signal for one display primary R, G, B or D1; and one of the three channels carries signals for two display primaries. For example the drive signals for the display primaries G and B are carried by the channels 11 and 12 respectively, while the drive signals for the display primaries R and D1, both being mutually exclusive, are carried by channel 10.

In order to obtain this, the drive signals for the display primaries R and D1 are combined in the amplitude domain by means of the multiplexer MUX.

The display device comprises an input circuit, which receives the signals coming from the three channels 10, 11, 12 and one splitter circuit for splitting the combined input signal coming from channel 10 in its components R and D1.

The signals thus obtained in the display device are the drive signals for each of the four display primaries R, G, B and D1. In the display screen these four drive signals drive the four display primaries as known in the art for driving display primaries, by means of electric to optic converters and optical channels.

Figure 9:
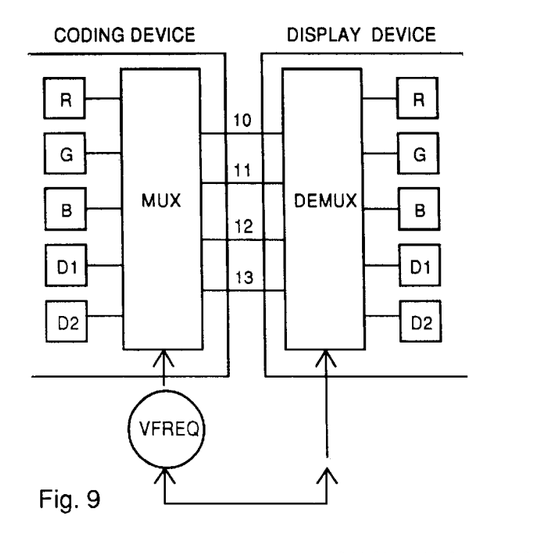
FIG. 9 shows part of a coding device and part of a display system, with four channels and five display primaries, applying combination of drive signals in the time domain.

FIG. 9 represents a part of the coding device, as well as a part of the display device. In the coding device drive signals for the five display primaries R, G, B, D1 and D2 have been calculated. For example again the display primaries R and D2 are mutually exclusive. This time the drive signals for the display primaries R and D2 are combined in the time domain. The multiplexer MUX is driven by a control signal having a frequency Vfreq being higher than the picture repetition rate in order to combine the drive signals for the display primaries R and D2 in the time domain without loss of information. These combined signals are then transmitted to the display device, where a demultiplexing system DEMUX again splits the information into drive signals for each of the display primaries R, G, B, D1 and D2.

Figure 10:
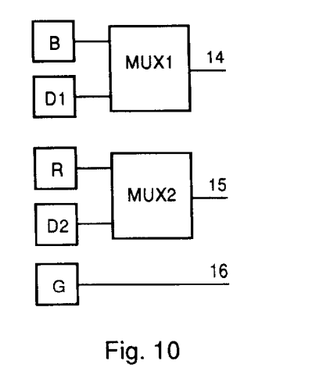
FIG. 10 represents part of a coding device, comprising two multiplexers for combining mutually exclusive signals on a channel.

FIG. 10 shows part of a coding device for the case where there are five display primaries R, G, B, D1 and D2, and only three channels 14, 15 and 16. In the calculating means (not represented) drive signals for the five display primaries have been calculated for a colour, starting from the three tristimulus values for that colour. There are only three channels 14, 15, 16, thus as discussed in case n=5, k=3 hereinabove preferably each channel carries at least one drive signal for one display primary, and two of the three channels carry two display primaries each. If, as shown in FIG. 4, the display primaries B and D1, and R and D2 are mutually exclusive, the drive signals for said mutually exclusive signals can be carried by one channel. In FIG. 10 is represented an embodiment with two multiplexers MUX1, MUX2. The drive signals for display primaries B and D1 are combined by means of a first multiplexer MUX1 to a combined signal carried by channel 14, while the drive signals for display primaries R and D2 are combined by means of a second multiplexer MUX2 to a combined signal carried by channel 14. The remaining drive signal for display primary G is carried all alone by channel 16.

Figure 11:
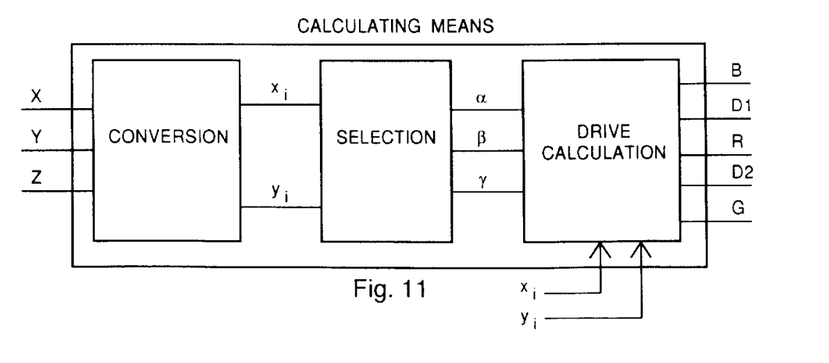
FIG. 11 shows a calculating means of a coding device in more detail.

FIG. 11 shows a calculating means of a coding device in more detail. Said calculating means comprises conversion means CONVERSION, selection means SELECTION and drive-calculating means DRIVE CALCULATION.

The conversion means CONVERSION convert the coordinates of each color point in function of the three tristimulus values X, Y, Z into coordinates ($x_i$, $y_i$) in the chromaticity diagram as explained hereinabove.

The selection means SELECTION selects for each point in the chromaticity diagram the display primaries which will represent the color point. The output of the selection means is a set of three display primaries $\alpha$, $\beta$, $\gamma$ to be driven in order to represent the color. Said set of three display primaries may be any combination of the display primaries R, G, B, D1, and D2. The selection itself is carried out by comparison of the location of the color point in the chromaticity diagram with respect to a straight line in said chromaticity diagram, said comparison being used either to calculate on-the-fly the drive signals for the display primaries, or to fill a LUT containing for each colour point the display primaries which need be driven for representing said colour.

The drive-calculating means DRIVE CALCULATION calculates the drive signals for each display primary. Said drive-calculating means DRIVE CALCULATION receives as input the coordinates ($x_i$, $y_i$) of the colour point in the chromaticity diagram and the output $\alpha$, $\beta$, $\gamma$ of the selection means SELECTION. The drive-calculating means DRIVE CALCULATION then calculates the values of the drive signals for each of the display primaries $\alpha$, $\beta$, $\gamma$ to be driven in order to represent the color.

What is claimed is:

1. Method for coding a signal which describes a picture as a function of three tristimulus values (X, Y, Z) to produce a signal which describes the picture as a function of n independent display primaries (R, G, B, D1, . . . , Dn–3), with n>3, the method comprising:

dividing the display primaries in a group of principal primaries and a group of auxiliary primaries, the group of principal primaries and the group of auxiliary primaries being distinguished in that the group of principal primaries includes primaries chosen out of n display primaries (R, G, B, D1, . . . , Dn–3), with n>3;

defining a principal straight line for each set of two principal primaries;

calculating drive signals for the n display primaries via a comparison of a location of a colour to be represented with respect to a principal straight line in a chromaticity diagram; and deciding which display primaries are to be driven for representing the colour based on the location of the colour with respect to the principal straight line, a plurality of the drive signals being mutually exclusive.

2. The method according to claim 1, including transmitting via k channels the picture as a function of the n display primaries to a display system, where k≦n.

3. The method according to claim 2, including splitting the drive signals describing the picture to drive each of the n display primaries.

4. The method according to claim 2, including combining in at least one of the k channels the mutually exclusive drive signals by multiplexing in the time domain, wherein k<n, and the mutually exclusive drive signals drive different display primaries.

5. The method according to claim 4, wherein the drive signals for the n display primaries comprise at least two rasters generated at a higher vertical frequency.

6. The method according to claim 4, wherein the multiplexing in the time domain comprises multiplexing successive mutually exclusive drive signals during successive vertical syncs.

7. The method according to claim 2, including combining in at least one of the k channels the mutually exclusive drive signals by multiplexing in the amplitude domain, wherein k<n, and the mutually exclusive drive signals drive different display primaries.

8. The method according to claim 7, wherein the number of display primaries coded per channel comprises n/k, and the number of channels carrying more than n/k display primaries comprises (n mod k) channels.

9. The method according to claim 7, wherein the multiplexing in the amplitude domain comprises splitting the range of a signal on the at least one of the k channels into p parts by introducing p-1 drive thresholds (TH1, TH2 ), each of the parts being allocated to one of the mutually exclusive drive signals.

10. The method according to claim 7, wherein the multiplexing in the amplitude domain comprises causing at least one of two maximum and two minimum drive signals of two display primaries to coincide at a drive threshold.

11. The method according to claim 7, wherein the multiplexing in the amplitude domain comprises digital coding.

12. The method according to claim 11, wherein the digital coding comprises coding to identify at least one of the mutually exclusive drive signals.

13. The method according to claim 1, including:

comparing a position to be represented and a position of an auxiliary primary with respect to a principal straight line associated with the auxiliary primary;

representing the position to be represented by three principal primaries if the positions are located on different sides of the principal straight line and if the auxiliary primary comprises an (n–3)th auxiliary primary, or if the position to be represented is located on the principal straight line;

representing the position to be represented by the auxiliary primary and two principal primaries if the positions are located on the same side of the principal straight line and if one of a plurality of auxiliary primaries is associated with the principal straight line, the two principal primaries defining the principal straight line; and multiplexing mutually exclusive drive signals if the number of display primaries exceed the number of channels for transmitting the picture as a function of the display primaries.

14. The method according to claim 13, wherein the multiplexing comprises multiplexing in the time domain.

15. The method according to claim 14, wherein the drive signals for the n display primaries comprise at least two rasters generated at a higher vertical frequency.

16. The method according to claim 14, wherein the multiplexing in the time domain comprises multiplexing successive mutually exclusive drive signals during successive vertical syncs.

17. The method according to claim 13, wherein the multiplexing comprises multiplexing in the amplitude domain.

18. The method according to claim 17, wherein the number of display primaries coded per channel comprises n/k, n being the number of display primaries and k being the number of channels for transmitting the picture as a function of the n display primaries, and the number of channels carrying more than n/k display primaries comprises (n mod k) channels.

19. The method according to claim 17, wherein the multiplexing in the amplitude domain comprises splitting the range of a signal on at least one of k channels into p parts by introducing p-1 drive thresholds (TH1, TH2), each of the parts being allocated to one of the mutually exclusive drive signals.

20. The method according to claim 18, wherein the multiplexing in the amplitude domain comprises causing at least one of two maximum and two minimum drive signals of two display primaries to coincide at a drive threshold.

21. The method according to claim 13, including choosing the principal primaries to distribute the auxiliary primaries as evenly as possible between the principal primaries.

22. The method according to claim 13, including mapping "out-of-gamut" colours onto an edge of a convex polygon formed by the n display primaries.

23. The method according to claim 13, including splitting the drive signals describing the picture to drive each of the n display primaries if the number of display primaries exceeds the number of channels.

24. A coding device for coding a signal which describes a picture as a function of three tristimulus values (X, Y, Z) to produce a signal which describes the picture as a function of n independent display primaries (R, G, B, D1, . . . , Dn–3), with n>3, the device comprising:

calculating means to calculate, for each colour to be represented as a function of three tristimulus values (X, Y, Z), drive signals for n display primaries (R, G, B, D1, . . . , Dn–3), the display primaries being divided in a group of principal primaries and a group of auxiliary primaries, the group of principal primaries and the group of auxiliary primaries being distinguished in that the group of principal primaries includes primaries chosen out of the n display primaries, each set of two principal primaries to define a principal straight line, a chromaticity diagram to compare a location of a colour with respect to a principal straight line, a plurality of the drive signals being mutually exclusive, and k channels to transmit the picture as a function of the n display primaries to a display system.

25. The coding device according to claim 24, wherein the number of k channels does not exceed the number of n display primaries.

26. The coding device according to claim 25, including at least one multiplexer to combine in the time domain mutually exclusive signals to drive different display primaries.

27. The coding device according to claim 26, wherein the at least one multiplexer is driven by control signals having a frequency higher than a repetition rate of the picture.

28. The coding device according to claim 26, wherein the at least one multiplexer combines mutually exclusive signals, the at least one multiplexer being driven by successive vertical syncs.

29. The coding device according to claim 25, including at least one multiplexer to combine in the amplitude domain mutually exclusive signals to drive different display primaries.

30. The coding device according to claim 29, wherein the at least one multiplexer is arranged and constructed to combine p mutually exclusive signals on at least one of the k channels, the coding device including:
    splitting means to split the range of a signal on the at least one of the k channels into p parts by introducing p-1 drive thresholds, and
    allocating means to allocate each of the parts of the channel to one of the mutually exclusive signals.

31. The coding device according to claim 29, including inverting means to cause at least one of two maximum and two minimum drive signals of two display primaries to coincide at a drive threshold.

32. The coding device according to claim 29, wherein the multiplexer comprises a digital multiplexer.

33. The coding device according to claim 32, including identification means to identify the mutually exclusive signals by identifying codes, the identifying codes being multiplexed into the drive signals.

34. The coding device according to claim 24, wherein the calculating means comprises:
    conversion means to convert the coordinates of a colour point represented as a function of the three tristimulus values (X, Y, Z) into coordinates ($x_i$, $y_i$) in the chromaticity diagram,
    selection means to select for each point in the chromaticity diagram the display primaries to represent the colour point, the selection being based on a comparison of the location of the colour point with respect to a principal straight line in the chromaticity diagram, the comparison to be used at least one of to calculate the drive signals for the display primaries and to calculate the display primaries to be driven for representing the colour, and
    drive-calculating means to calculate the drive signals for each display primary, the drive-calculating means to receive at least one of the coordinates ($x_i$, $y_i$) of the colour point in the chromaticity diagram and an output of the selection means.

35. The coding device according to claim 34, including mapping means to map "out-of-gamut" colours onto an edge of an convex polygon formed by the n display primaries in the chromaticity diagram.

36. Display device comprising n display primaries, n>3, suitable for receiving signals which are combined on one channel, the device comprising:
    an input circuit to receive input signals, coded in a form of combined signals to drive n display primaries,
    at least one splitter circuit to split the combined input signals into components to form n drive signals to drive the n display primaries, the at least one splitter circuit comprising means to invert at least one of the components of the combined input signals,
    a display screen to display a picture, the display screen to use the n drive signals to drive the n display primaries.

37. The display device according to claim 36, wherein the at least one splitter circuit comprises a circuit arranged and constructed to clip the combined signals to a drive threshold.

38. The display device according to claim 36, including a wide gamut switch to switch between one of a standard colour display constructed and arranged to use three display primaries and a display system constructed and arranged to use n display primaries.

39. Display device comprising n primaries, n>3, for receiving time-multiplexed signals, the device comprising:
    an input circuit to receive input signals coded in a form of time-multiplexed signals to drive n display primaries,
    a demultiplexing system to split information into drive signals for each of the display primaries, the demultiplexing system comprising means to invert at least one of the components of the time-multiplexed input signals,
    a display screen to display a picture, the display screen to use the drive signals for each of the display primaries.

40. The display device according to claim 39, wherein the demultiplexing system is arranged and constructed to demultiplex mutually exclusive successive signals during successive vertical syncs.

41. The display device according to claim 39, including a wide gamut switch to switch between one of a standard colour display constructed and arranged to use three display primaries and a display system constructed and arranged to use n display primaries.

42. The method according to claim 1, wherein the primaries chosen out of the n display primaries comprise primaries arbitrarily chosen out of the n display primaries.

43. The coding device according to claim 24, wherein the primaries chosen out of the n display primaries comprise primaries arbitrarily chosen out of the n display primaries.

* * * * *